(12) United States Patent
Gao et al.

(10) Patent No.: US 8,571,330 B2
(45) Date of Patent: Oct. 29, 2013

(54) VIDEO THUMBNAIL SELECTION

(75) Inventors: Yuli Gao, Palo Alto, CA (US); Tong Zhang, San Jose, CA (US); Jun Xiao, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1077 days.

(21) Appl. No.: 12/561,923

(22) Filed: Sep. 17, 2009

(65) Prior Publication Data
US 2011/0064318 A1    Mar. 17, 2011

(51) Int. Cl.
*G06K 9/62*    (2006.01)
(52) U.S. Cl.
USPC ....... 382/224; 382/176; 715/838; 348/333.05
(58) Field of Classification Search
USPC .................................................. 382/176, 224
See application file for complete search history.

(56) References Cited

U.S. PATENT DOCUMENTS

| | | | | |
|---|---|---|---|---|
| 6,721,488 B1* | 4/2004 | Dimitrova et al. | | 386/241 |
| 6,834,288 B2* | 12/2004 | Chen et al. | | 1/1 |
| 7,035,435 B2* | 4/2006 | Li et al. | | 382/107 |
| 7,483,624 B2* | 1/2009 | Zhang | | 386/241 |
| 7,555,718 B2* | 6/2009 | Girgensohn et al. | | 715/723 |
| 7,885,794 B2* | 2/2011 | Liu et al. | | 703/2 |
| 2002/0126203 A1* | 9/2002 | Yu et al. | | 348/61 |
| 2003/0083871 A1* | 5/2003 | Foote et al. | | 704/233 |
| 2003/0210886 A1* | 11/2003 | Li et al. | | 386/46 |
| 2004/0088723 A1* | 5/2004 | Ma et al. | | 725/19 |
| 2004/0181545 A1* | 9/2004 | Deng et al. | | 707/103 R |
| 2005/0228849 A1* | 10/2005 | Zhang | | 709/200 |
| 2006/0150104 A1* | 7/2006 | Lira | | 715/733 |
| 2007/0101268 A1* | 5/2007 | Hua et al. | | 715/721 |
| 2007/0124752 A1* | 5/2007 | Sakai | | 725/8 |
| 2007/0136755 A1* | 6/2007 | Sakai | | 725/46 |
| 2007/0162873 A1* | 7/2007 | Haro et al. | | 715/838 |
| 2007/0263128 A1* | 11/2007 | Zhang | | 348/700 |
| 2008/0120291 A1* | 5/2008 | Delgo et al. | | 707/5 |
| 2009/0064003 A1 | 3/2009 | Harris et al. | | |
| 2011/0064318 A1* | 3/2011 | Gao et al. | | 382/224 |

FOREIGN PATENT DOCUMENTS

WO    WO 9936863 A2 *    7/1999

* cited by examiner

*Primary Examiner* — Jason M. Repko
*Assistant Examiner* — Gandhi Thirugnanam
(74) *Attorney, Agent, or Firm* — Jack H. McKinney

(57) ABSTRACT

A method for selecting a video thumbnail includes generating a visual theme model for a sample set of images that are representative of textual information corresponding to a video file. Each of a set of candidate key frames is distinguished according to similarities shared between the candidate key frames and the visual theme model. A display is caused of a selected one of the distinguished candidate key frames as a video thumbnail for the video file.

15 Claims, 7 Drawing Sheets

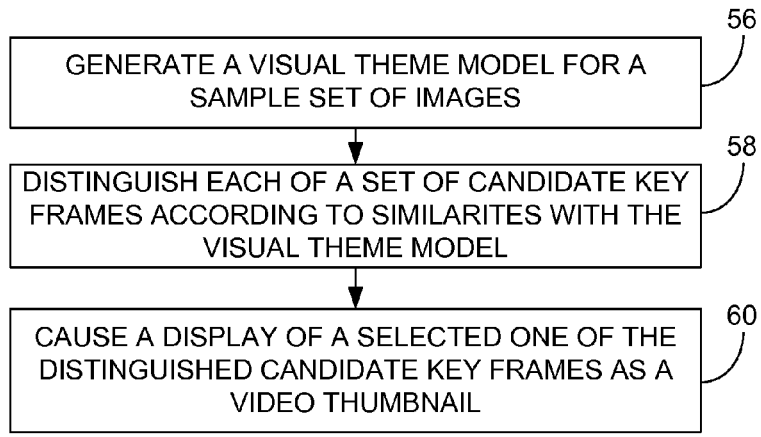
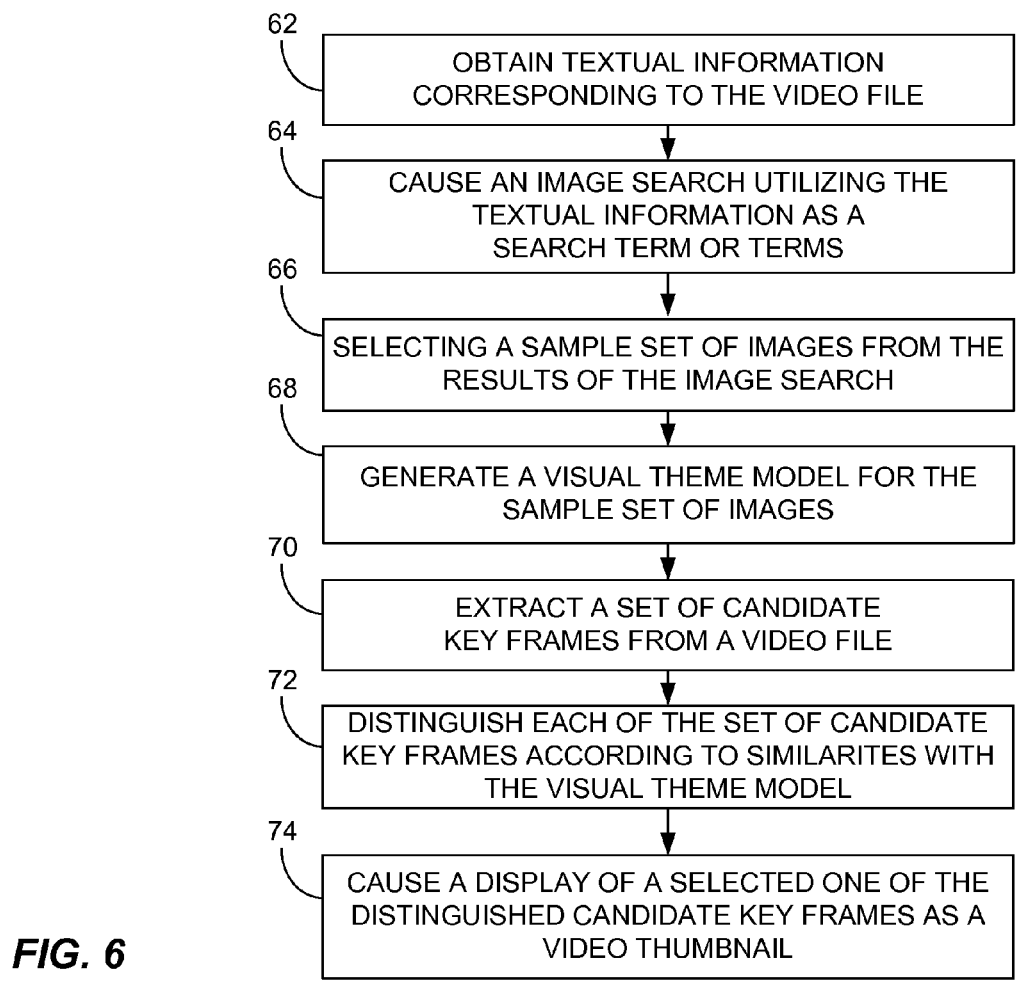
FIG. 5
FIG. 6

VIDEO THUMBNAIL SELECTION

BACKGROUND

With the popularity of on-line video based web services, an ever increasing number of electronic video files are being created and shared. Different electronic video files can be distinguished from one another based on thumbnail representations of the video files. Often times, the thumbnail is generated from a selected key frame extracted from the video file. A difficulty arises in how to select a candidate frame that is representative of the video file's theme.

DRAWINGS

FIGS. 5-6 are flow diagrams depicting steps taken to implement various embodiments.

DETAILED DESCRIPTION

A single video thumbnail image can have a strong influence over a user's Internet browsing behavior. A thumbnail that is representative of a video's theme can greatly improve video search and retrieval task performance and user satisfaction. For example, one might search for videos related to a holiday such as Thanksgiving. A multitude of results are returned and viewed. The given video represented by a thumbnail that is visually indicative of an expected Thanksgiving theme is more likely to be selected than one that is not. Various embodiments described below operate to help identify candidate key-frames that are most similar to a theme of a video file. In this manner, a thematically relevant key frame can be selected as a thumbnail to represent the video file.

The following description is broken into sections. The first, labeled "Environment," describes exemplary environments in which embodiments may be implemented. The second section, labeled "Components" describes various physical and logical components utilized to implement various embodiments. The third section, labeled as "Operation", describes steps taken to implement various embodiments. The last section, labeled "Example," describes an example in which:

textual information corresponding to the video file is identified;
a set of sample images representative of the textual information is obtained;
a visual theme model is generated for the sample set of images;
a set of candidate of key frames are extracted from the video file; and
the set of candidate key frames are evaluated against the visual theme model to identify a key frame for use as a thumbnail for the video file.

Figure 1:
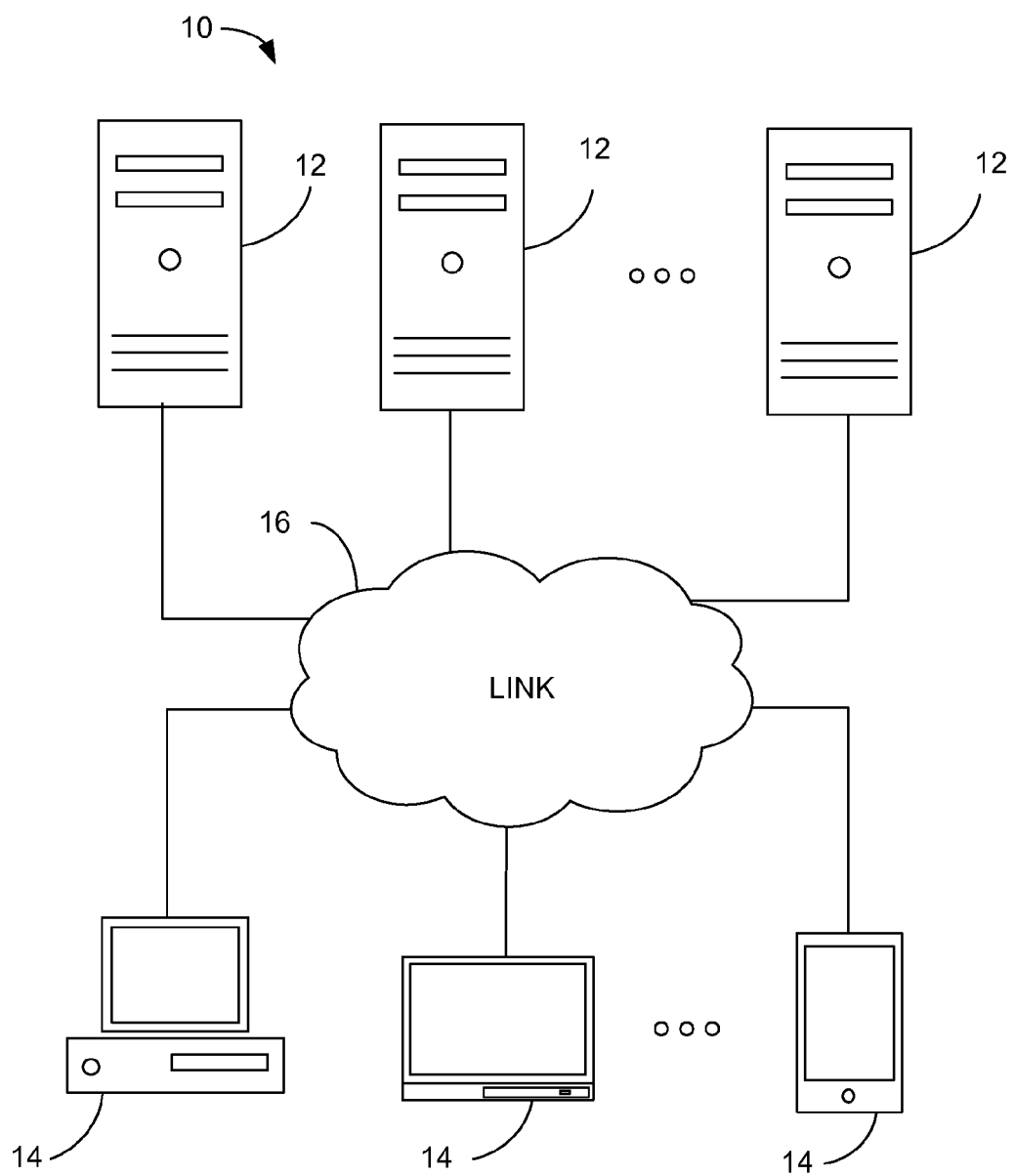
FIG. 1 depicts an exemplary environment in which embodiments may be implemented.

ENVIRONMENT: FIG. 1 depicts exemplary environment 10 in which embodiments may be implemented. Environment 10 includes servers 12 and clients 14 interconnected via link 16. Each server 12 represents generally any computing device capable of serving requested content to a client 14 via link 16. The term content refers to visual and audible information that can be presented to a user of a client 14. Examples include text, still, images, audio, and video. Content can also include instructions designed to be processed by a client 14. Examples include HTML code and various scripts.

Each client device 14 represents generally any computing device capable of requesting content from servers 12 via link 16. Clients 14 are also responsible for receiving and processing responses to the requests. Processing can include displaying visual content such as text, images, and motion video on a monitor as well as broadcasting audio content via one or more speakers.

Link 16 represents generally one or more of a cable, wireless, fiber optic, or remote connection via a telecommunication link, an infrared link, a radio frequency link, or any other connector or system that provides electronic communication. Link 16 may represent an intranet, the Internet, or a combination of both. The paths followed by link 16 between servers 12 and clients 14 as depicted in FIG. 1 represent the logical communication paths between these devices, not necessarily the physical paths between the devices.

Figure 2:
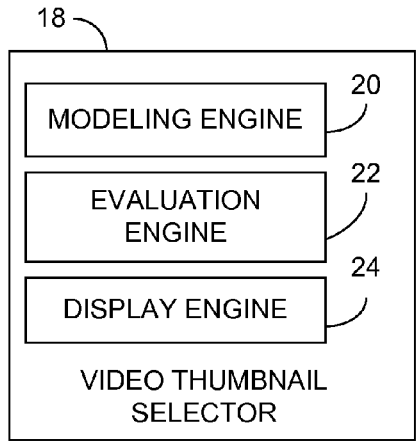
FIG. 2 depicts an exemplary video thumbnail selector according to an embodiment.

COMPONENTS: FIG. 2 depicts an example of a video thumbnail selector 18 referred to herein as selector 18. Selector 18 represents generally any combination of hardware and programming configured for use in selecting a thumbnail for a video file. In the example of FIG. 2, selector 18 is shown to include modeling engine 20, evaluation engine 22, and display engine 24.

Modeling engine 20 represents generally any combination of hardware and programming configured to generate a visual theme model for a sample set of images. That sample set is representative of textual information corresponding to a video file. The textual information, may for example, include a title for the video file, key words associated with the video file, text extracted from the video file, and audio extracted from the video file and converted to text. In short, the textual information can represent a theme. For example, a Halloween video may include the word Halloween in the title and be associated with the key words costumes, party, and pumpkin. Modeling engine 20 then uses the textual information as a keyword or keywords to instigate an image search collecting a sample set of images. Such an image search conducted via Google® can return a multitude of images. The results are typically ranked allowing modeling engine 20 to identify a predetermined number of the top ranked images as the sample set of images for use in generating the visual theme model.

A visual theme model is a statistical representation of features shared among a sample set of images with respect to a given feature type or types. Examples of feature types include color, texture, shapes, and faces among many others. Each feature type has its own set of features. A visual theme model includes or otherwise identifies a weighted value for each feature identified for a given feature type. Features with higher weight values are more predominant among the sample set of images than those features with lower weight values. Imagine using the term "Halloween" to conduct an image search. With respect to color, the resultant sample set of images may be predominantly black flowed by various shades of orange and brown. In this example, the black color feature would have the highest weight value followed by different shades of orange and brown. Other colors would have noticeably lower if not negligible weight values.

Evaluation engine 22 represents generally any combination of hardware and programming configured to distinguish each of a set of candidate key frames according to similarities shared between the candidate key frames and the visual theme model generated by modeling engine 20. The set of candidate key frames are frames taken from the video file. The set can be selected using various techniques. For unedited video, those techniques can include locating frames with faces as well as locating frames associated with laughter, speech, or sudden changes in volume. Other techniques include locating frames immediately following a period of camera panning or zooming as well as frames containing moving objects. For edited videos, techniques can include segmenting the video file into shots and selecting a frame from each shot according to image quality.

Evaluation engine 22 distinguishes the set of candidate key frames by evaluating each such key frame against the weighted feature values of the visual theme model and ranking each key frame according to similarities shared between that candidate key frame and the weighted feature values. Thus, a candidate key frame whose dominant feature or features have higher weight values in the visual theme model will be ranked higher than another candidate key frame whose dominant features have lower weight values. Continuing with the Halloween example from above, a candidate key frame that is predominantly black would be ranked higher than a candidate key frame that is predominantly blue. A candidate key frame that is predominantly black, orange, and perhaps brown would be ranked higher than a candidate key frame that is predominantly black with little,or no orange and brown or one that is predominantly orange with little or no black.

Display engine 24 represents generally any combination of hardware and programming configured to cause the display of a selected one of the distinguished candidate key frames as a video thumbnail for the video file. The particular candidate key frame selected may be selected manually or automatically. If automatic, the candidate key frame from the set having the highest rank may be selected. If manual, display engine 24 may cause a display of the set of candidate key frames organized according to rank allowing a user to select a desired key frame.

The thumbnail caused to be displayed by display engine 24 may be one of a number of thumbnails displayed as part of a web page. Causing the display of the thumbnail can be accomplished in a number of fashions. In one example, display engine 24 can cause the display by associating the selected key frame with the video file such that when an icon for selecting or otherwise identifying the video file is displayed, that icon includes the selected key frame as the thumbnail. In another example, display engine 24 can take a more active role and generate a user interface that includes the selected key frame as a thumbnail for selecting or otherwise identifying the video file.

Figure 3:
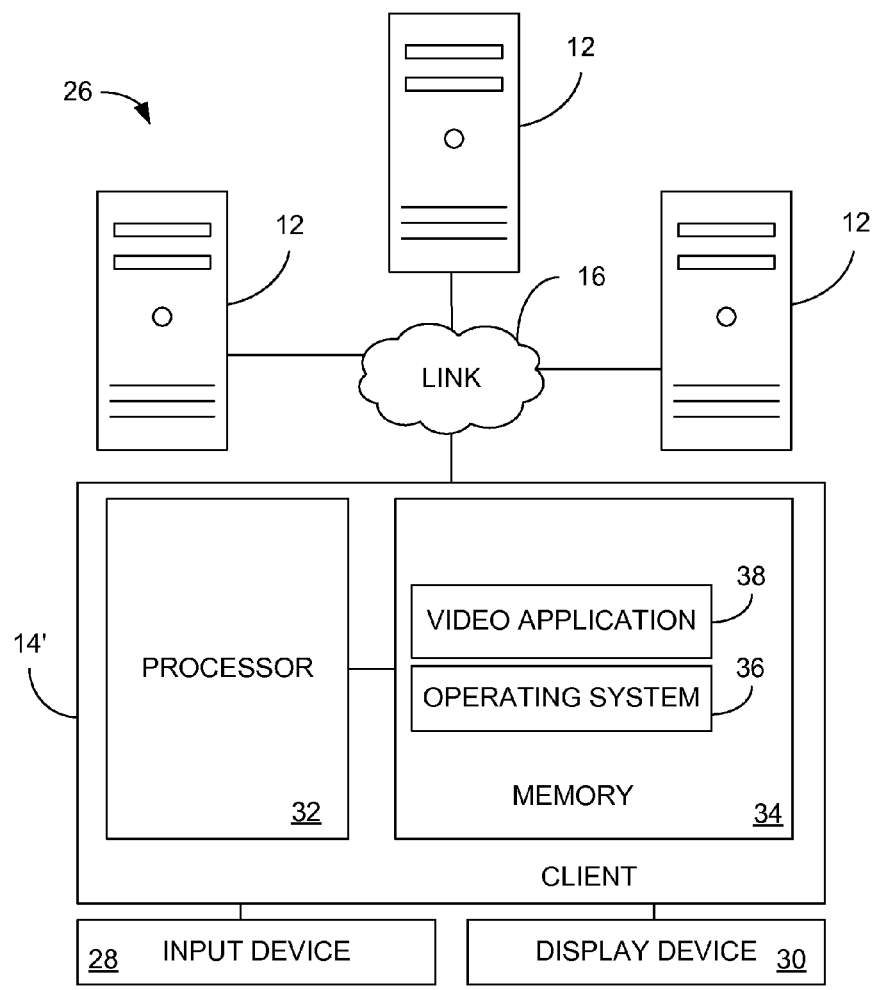
FIGS. 3-4 depict various implementations of the video thumbnail selector of FIG. 2 according to embodiments

Selector 18 may be implemented in a number of environments such as environment 26 of FIG. 3. Environment 26 includes client 14' and servers 12 interconnected by link 16. Client 14' is shown to include input device 28, display device 30, processor 32 and memory 34. Input device 28 represents generally any device such as a mouse, keyboard, or a touch screen through which a user can interact with a user interface presented via display device 30. Display device 30 represents generally any display device capable of displaying a graphical user interface at the direction of processor 32. Processor 32 represents generally any device capable of executing program instructions stored in memory 34. Memory 34 represents generally any memory configured to store program instructions and other data.

Memory 34 is shown to include operating system 36 and video application 38. Operating system 36 represents generally any software platform on top of which other programs or applications such as video application 38 run. Examples include Linux® and Microsoft Windows®. In this example, operating system 36 includes drivers for controlling the operation of components 28 and 30. In particular, these drivers translate generic commands into device specific commands capable of being utilized by components 28 and 30.

Video application 38 represents generally any programming that, when executed, implements the functionality of selector 18 of FIG. 2. In particular, video application 38, when executed by processor 32, is responsible for generating a visual theme model for a sample set of images that are representative of textual information corresponding to a video file. In doing so video application 38 may extract or otherwise obtain the textual information and use that information as a search term or terms to cause an image search for related images that might be found on servers 12. The sample set of images are taken from the image search results. Video application 38 distinguishes each of a set of candidate key frames according to similarities between that candidate key frame and the visual theme model. Video application 38 causes a selected one of the distinguished candidate key frames to be displayed as a video thumbnail for the video file.

Figure 4:
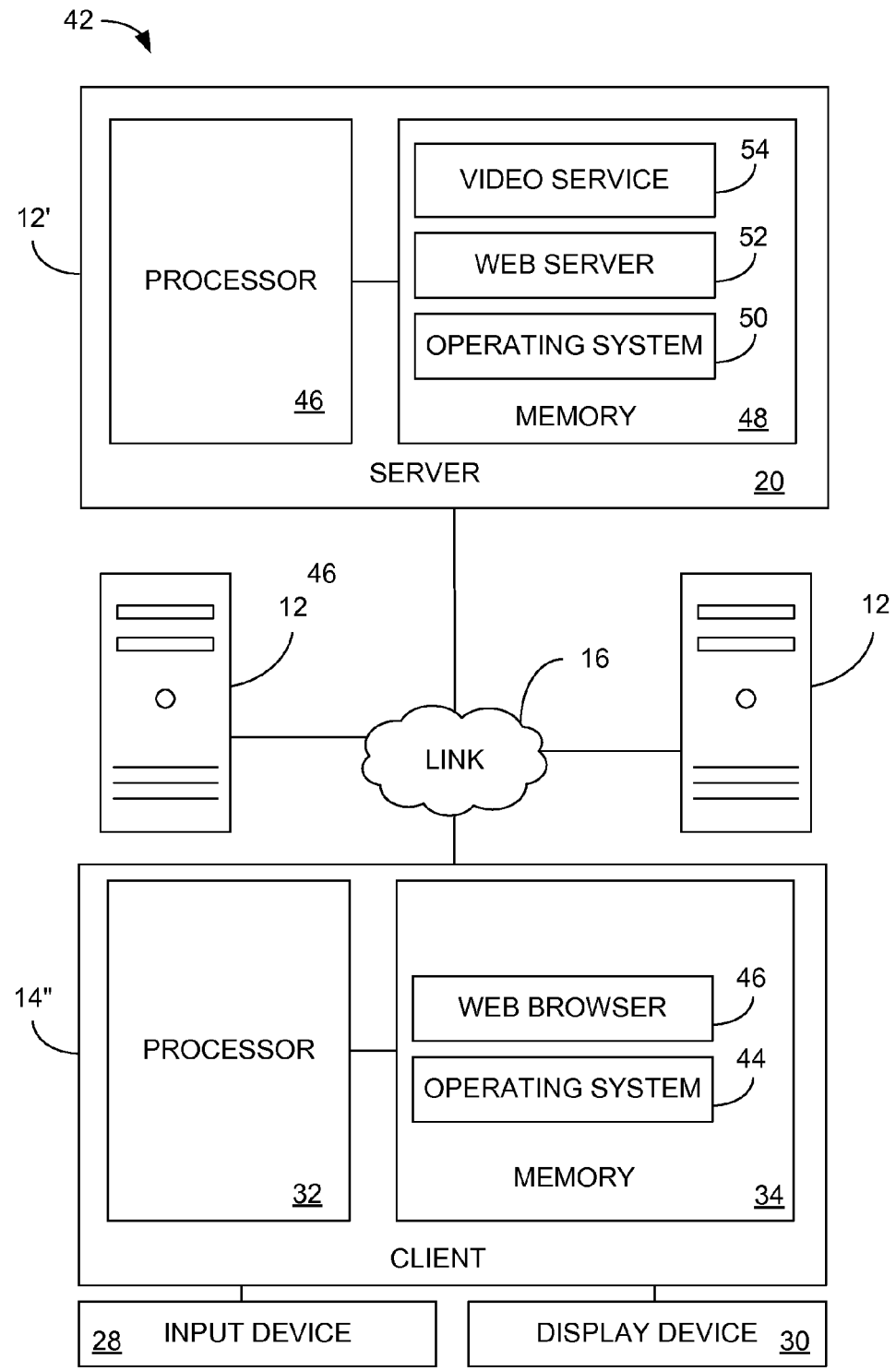

Selector 18 of FIG. 2 may be implemented in environment 42 of FIG. 4. Environment 42 includes client 14", server 12' and servers 12 interconnected via link 16. Client 14" is shown to include input device 28, display device 30, processor 32 and memory 34. Memory 34, in this example, is shown to include operating system 44 and web browser 46. Operating system 44 represents generally any software platform on top of which other programs or applications such as web browser 46 run. Examples include Linux® and Microsoft Windows®. In this example, operating system 36 includes drivers for controlling the operation of components 28 and 30. In particular, these drivers translate generic commands into device specific commands capable of being utilized by components 28 and 30. Web browser 46 represents generally any programming that, when executed by processor 32, requests and causes a display of content served by server 12'. Web browser 46 is also responsible for communicating data indicative of user input back to server 12'.

Server 12' is shown to include processor 46 and memory 48. Processor 46 represents generally any device capable of executing program instructions stored in memory 48. Memory 48 represents generally any memory configured to store program instructions and other data. Memory 48 is shown to include operating system 50, web server 52, and video service 54. Operating system 50 represents generally any software platform on top of which other programs or applications such as web server 52 and video service 54 run. Examples include Linux® and Microsoft Windows®.

Web server 52 in combination with video service 54 represents generally any programming that, when executed, implements the functionality of selector 18 of FIG. 2. In particular, video service 54, when executed by processor 32, is responsible for generating a visual theme model for a sample set of images that are representative of textual information corresponding to a video file. In doing so video service 54 may extract or otherwise obtain the textual information and use that information as a search term or terms to cause an image search for related images that might be found on servers 12. The sample set of images are taken from the image search results. Video service 54 distinguishes each of a set of candidate key frames according to similarities between that candidate key frame and the visual theme model. Video service 54 causes a selected one of the distinguished candidate key frames as a video thumbnail for the video file. In doing so, video service 54 with web server 52 may return to client 14" a user interface that includes a selected candidate key frame as a video thumbnail in an icon for selecting the video file.

OPERATION: FIGS. 5-6 are exemplary flow diagrams of steps taken to implement video thumbnail selection according to various embodiments. In discussing FIGS. 5-8, reference may be made to the diagrams of FIGS. 1-4 to provide contextual examples. Implementation, however, is not limited to those examples.

Starting with FIG. 5, a visual theme model for a sample set of images is generated (step 56). Referring back to FIG. 2, modeling engine 20 may be responsible for implementing step 56. The sample set of images may be obtained from the results of an image search. In particular, textual information corresponding to a subject video file is used as a search term or terms in an image search. The textual information, as previously discussed, may include the title of the video file, key words associated with the video file, text extracted from various frames of the video file, as well as audio extracted from the video file and converted to text. The results of the search include a ranked listing of images. The sample set of images can then include a desired number of the top most ranked images returned in response to the image search.

As previously discussed, a visual theme model is a statistical representation of features shared among a sample set of images with respect to a given feature type or types. Examples of feature types include color, texture, shapes, and faces among many others. Each feature type has its own set of features. A visual theme model includes or otherwise identifies a weighted value for each feature identified for a given feature type. Features with higher weight values are more predominant among the sample set of images than those features with lower weight values.

In one example, modeling engine 20 of FIG. 2 extracts the common principle color components $D_{pc}$ for a given a set of images $S=\{I_1, I_2, \ldots I_n\}$ to generate a visual theme model based on a color feature type. An algorithm constructed to achieve this goal is outlined as follows:

1. For each image $I_i$ in S, cluster its pixels to obtain major color clusters and their corresponding weights: $D_i=\{(c_{i1}, w_{i1}), (c_{i2}, w_{i2}), \ldots (c_{im}, w_{im})\}$, where $c_{ij}$ represents the mean color of the cluster and $w_{ij}$ represents its relative size.
2. Compute the joint color distribution $D_s$ of the entire image set S by concatenating the color clusters obtained from each image $I_i$ in S, i.e.

$$D_s = \bigcup_{I_i \in S} D_i(I_i)$$

3. Iteratively merge color clusters in $D_s$ with color distances smaller than a threshold $T_1$, until all the remaining color clusters in $D_s$ are mutually distant from each other according to the threshold.
4. Rank the color components in $D_s$ by their weights and obtain $D_{pc}$ as the top K color components in $D_s$ such that the sum of their weights exceeds a percentage threshold $T_2$ of the sum of total color component weights in $D_s$.

Continuing with the Halloween example, application of the algorithm to a set of the top 20 returned images from Google® using the query keyword "Halloween" identifies a weighted value for each of a set of color features. In a particular example, application of the algorithm produced the following results:

| | |
|---|---|
| Black | 100 |
| Brown | 53 |
| Red/Orange | 16 |
| Yellow/Orange | 14 |
| Orange | 14 |
| Green | 12 |
| Magenta | 12 |
| Red | 11 |
| Gray | 9 |

In another example, the visual theme model may correspond to more than one feature type. In this case, the model will include, for each image feature type, a weighted value for each of a set of features shared among the sample set of images. For example, in addition to a color feature type, the visual theme model may encompass a texture feature type that includes features such as smooth, rough, and the like. Other feature types can include shapes with features such as circles, arcs, and rectangles among others.

Once the visual theme model is generated, each of a set of candidate key frames taken from the video file is distinguished according to similarities shared between that candidate key frame and the visual theme model (step 58). Referring again to FIG. 2, evaluation engine 22 may be responsible for implementing step 58. In one example, evaluation engine 22 evaluates each of the candidate key frames against the weighted feature values identified by the visual theme model ranking each key frame based on the similarities shared between the key frame and the weighted feature values. In other words, the key frames are ranked according to their "visual distance" to the visual theme model. With respect to the color feature type, evaluation engine 22 extracts major color components of each key frame and determines a "distance" or difference between those extracted color components and the weighted color feature values identified in the visual theme model. The standard Earth Mover Distance (EMD) may be adopted as the measure to determine the distance between each key frame and the visual theme model.

As noted above, the visual theme model may correspond to a plurality of feature types. In such cases, one of those feature types may be identified as the most salient. For example, one feature type may have the greatest disparity or range of feature value weights indicating that a given feature for that feature type is dominant amongst the sample set of images. Using the Halloween example above, the black feature of the color feature type may well be dominant with respect to features of other feature types such as shape or texture. In such a case, the color feature type would be identified as having the greatest disparity in feature value weights. Thus, in step 58, the each of the key frames would be evaluated against the weighted feature values of the color feature type. Each key frame would be ranked according to similarities shared between that key frame and the weighted feature values of the color feature type.

In another example, the key frames may, in step 58, be evaluated against the weighted feature values of multiple feature types rather than only the feature type with the dominant feature. Here, each feature type may be assigned a weighted value. Each weighted feature type value corresponds to a magnitude in the disparity in feature values for that feature type. Thus, the feature type having the dominant feature would be the dominant feature type and would weigh most in ranking the key frames. So, the key frames are evaluated against the weighted features of each feature type. The relevance of the evaluation with respect to the features of a given feature type decreases as the weighted value for that feature type decreases. The overall rank of a given key frame would then be determined as a function of an evaluation of the key frame against each of the feature types represented in the visual theme model.

Continuing with the flow diagram of FIG. 5, a display is caused of a selected one of the distinguished candidate key frames as a video thumbnail for the video file (step 60). Referring to FIG. 2, display engine 24 may be responsible for implementing step 60. As previously discussed, the particular candidate key frame selected may be selected manually or automatically. If automatic, the candidate key frame from the set having the highest rank may be selected. If manual, display engine 24 may cause a display of the set of candidate key frames organized according to rank allowing a user to select a desired key frame.

The thumbnail caused to be displayed by display engine 24 may be one of a number of thumbnails displayed as part of a web page. Causing the display of the thumbnail can be accomplished in a number of fashions. In one example, display engine 24 can cause the display by associating the selected key frame with the video file such that when an icon for selecting or otherwise identifying the video file is displayed, that icon includes the selected key frame as the thumbnail. In another example, display engine 24 can take a more active role and generate a user interface that includes the selected key frame as a thumbnail for selecting or otherwise identifying the video file.

Moving on to FIG. 6, in a particular implementation, textual information corresponding to the video file is obtained (step 62). An image search is caused utilizing the textual information as a search term or terms (step 64). A sample set of images are selected from the results of the image search (step 66). A visual theme model is generated from the sample set of images (step 68). Referring back to FIG. 2, modeling engine 20 may be responsible for implementing steps 62-68. In a given example, modeling engine 20 uses textual information to conduct an image search using a search engine such as Google®. The textual information may include the video file title, keywords associated with the video file and perhaps text and converted audio extracted from the video file. Modeling engine 20 chooses a predetermined number of the top rated results as the sample set of images and generates a visual theme model as previously discussed with respect to FIG. 5.

Continuing with FIG. 6, a set of candidate key frames is extracted from a video file (step 70). Each of a set of candidate key frames is distinguished according to similarities shared between that candidate key frame and the visual theme model (step 72). Referring again to FIG. 2, evaluation engine 22 may be responsible for implementing steps 70 and 72. In one example, evaluation engine 22 evaluates each of the candidate key frames against the weighted feature values identified by the visual theme model, ranking each key frame based on the similarities shared between the key frame and the weighted feature values.

A display is caused of a selected one of the distinguished candidate key frames as a video thumbnail for the video file (step 74). Referring to FIG. 2, display engine 24 may be responsible for implementing step 74. As previously discussed, the particular candidate key frame selected may be selected manually or automatically. If automatic, the candidate key frame from the set having the highest rank may be selected. If manual, display engine 24 may cause a display of the set of candidate key frames organized according to rank allowing a user to select a desired key frame. Causing the display of the thumbnail can be accomplished in a number of fashions. In one example, display engine 24 can cause the display by associating the selected key frame with the video file such that when an icon for selecting or otherwise identifying the video file is displayed, that icon includes the selected key frame as the thumbnail. In another example, display engine 24 can take a more active role and generate a user interface that includes the selected key frame as a thumbnail for selecting or otherwise identifying the video file.

Figure 7:
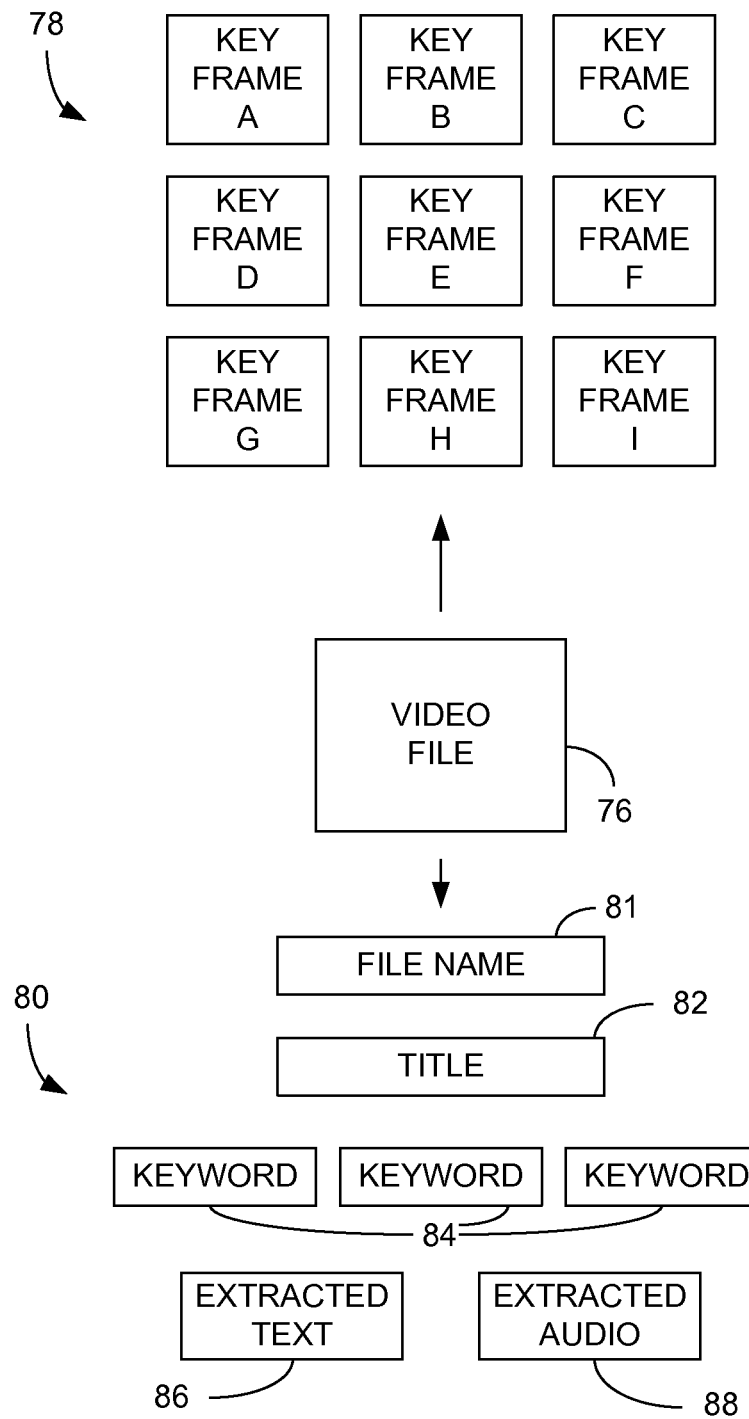
FIG. 7 depicts an example in which key-frames are taken from a video file and in which textual information associated with that video file is identified according to an embodiment.
Figure 8:
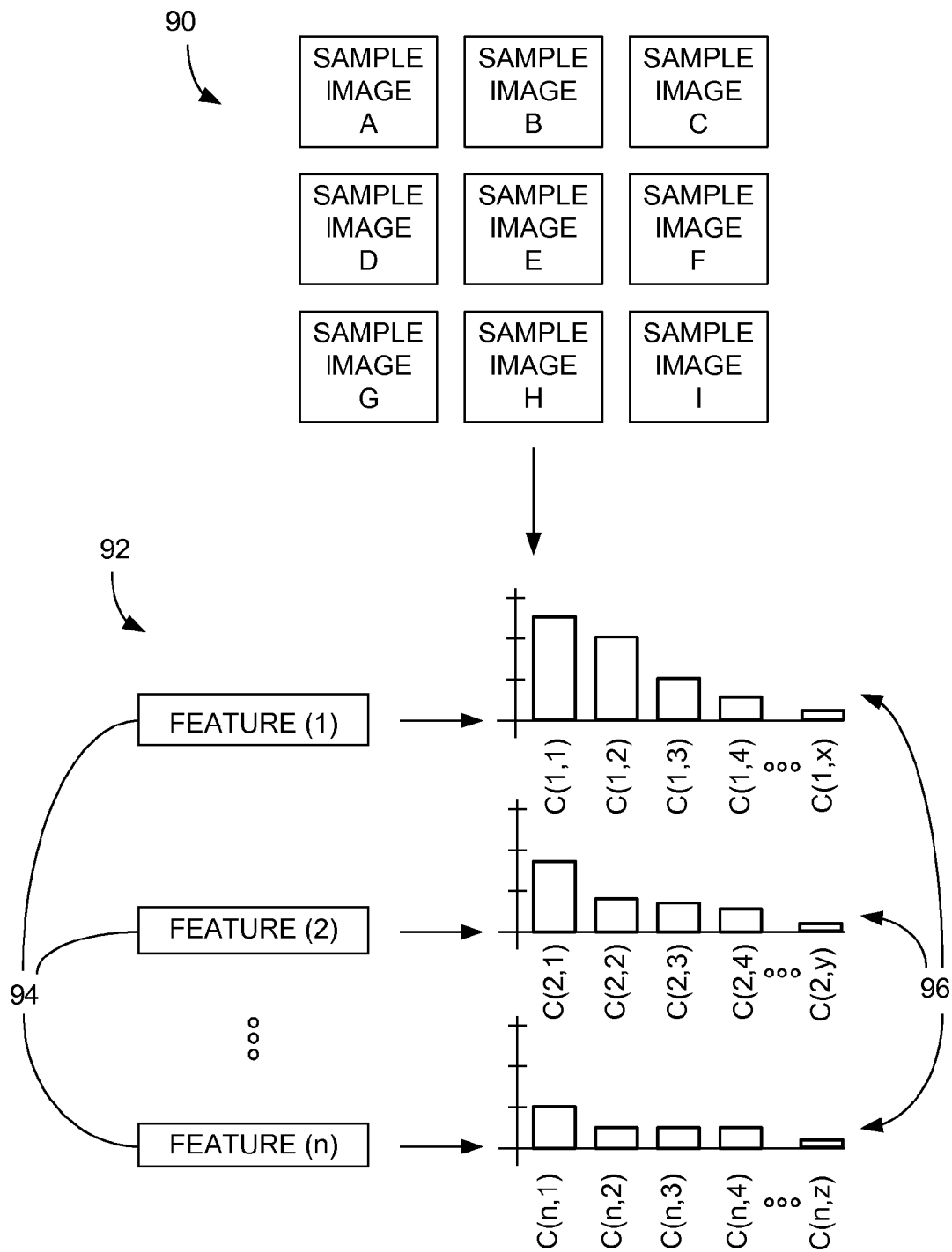
FIG. 8 depicts an example in which a video theme model is generated from a sample set of images according to an embodiment.
Figure 9:
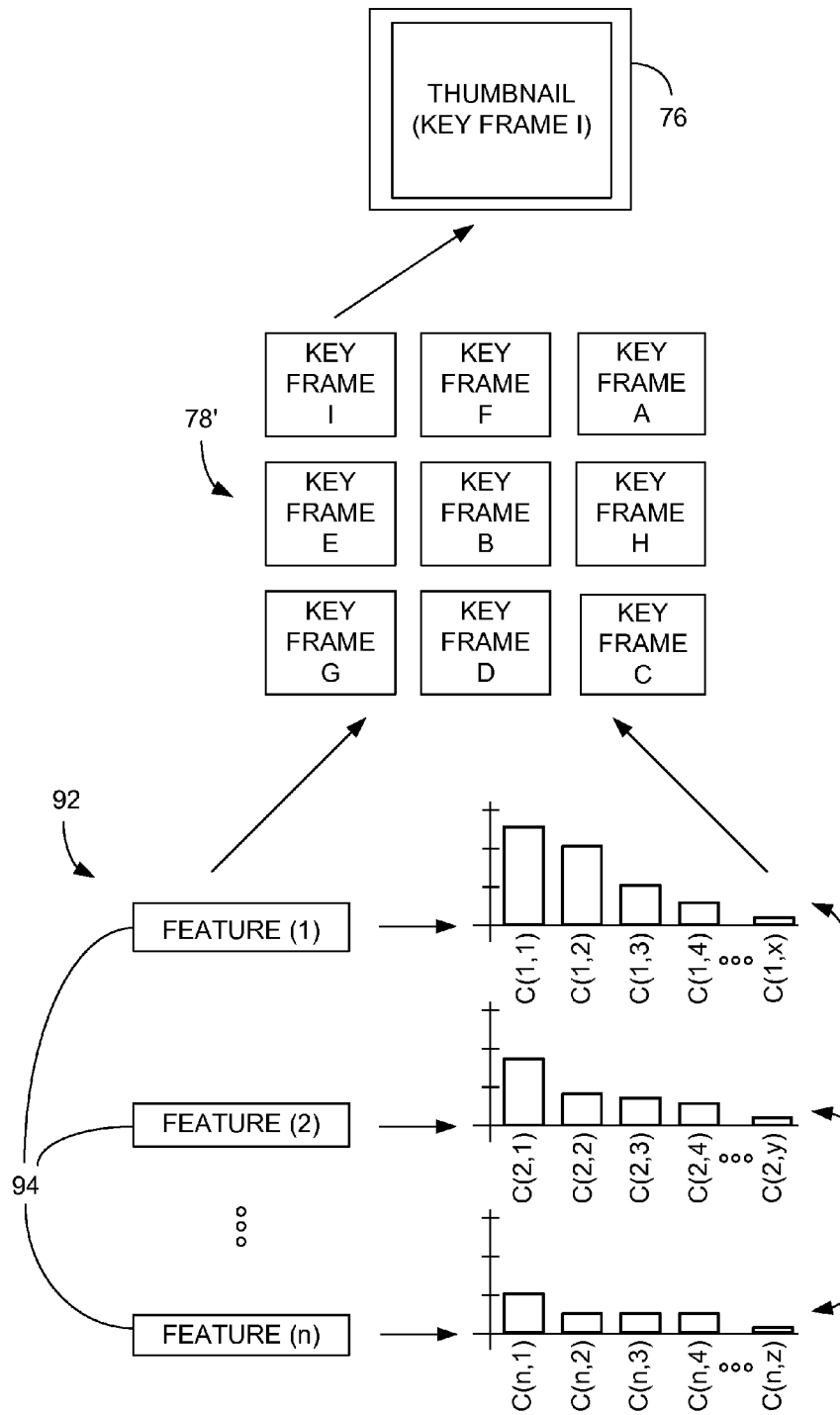
FIG. 9 depicts an example in which the key frames have been evaluated against the visual theme model and ranked with a particular key-frame having been selected as the thumbnail for the video file according to an embodiment.

EXAMPLES: The diagrams of FIGS. 7-9 are used to depict an exemplary workflow in which a thumbnail is selected for a video file 76. Starting with FIG. 7, a set of candidate key frames 78 have been extracted from video file 76. In this example, a set of nine candidate key frames (A through I) have been extracted. Also, textual information 80 associated with the video file has been identified. The textual information 80, in this example, includes the video filename 81, title 82, keywords 84 associated with video file 76 such as those entered as tags in social networks, text extracted from close captions 86, and text obtained from automatic audio-to-text translations. 88.

Moving to FIG. 8, an image search has been conducted using textual information 80 as a search term or terms. A sample set of images 90 have been selected from the search results. Visual theme model 92 has been generated from the sample set 90. Model 92 provides a statistical representation of features shared among a sample set of images with respect to a set of feature types. In the example of FIG. 8, model 92 covers a set of (n) feature types 94. Each feature type is associated with a set of weighted feature values 96. Model 92 includes a set of (x) weighted feature values for feature type (1), a set of (y) weighted feature values for feature type (2), and a set of (z) feature values for feature type (n). In a given example, feature type (1) may correspond to color, feature type (2) to texture, and feature type (n) to shape. A visual inspection reveals that the weighted values for feature type (1) has the greatest disparity or range of feature value weights indicating that feature type (1) may be identified as the most salient among the sample set of images 90.

Referring now to FIG. 9, the extracted set of key frames 78' have been distinguished according to similarities shared between the candidate key frames and the visual theme model 92. In this example, each candidate key frame has been evaluated against the visual theme model 92 and ranked accordingly. Where feature type (1) is identified as being the most salient, each key frame may be evaluated against the weighted feature values ($c(1,1)$ through $c(1,x)$) for feature type (1). In FIG. 9, key frame (I) has the highest rank and has been selected as the video thumbnail for video file 76.

CONCLUSION: The diagram of FIG. 1 is used to depict an exemplary environment in which various embodiments may be implemented. Implementation, however, is not so limited. FIGS. 2-4 show the architecture, functionality, and operation of various embodiments. Various components illustrated in FIGS. 2-4 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 5-6 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for selecting a video thumbnail, comprising:
   generating a visual theme model for a sample set of images that are representative of textual information corresponding to a video file;
   identifying, for each of a plurality of image feature types, a weighted value for each of a set of features shared among the sample set of images;
   distinguishing each of a set of candidate key frames according to similarities shared between that candidate key frame and the visual theme model wherein distinguishing comprises:
      identifying an image feature type of the plurality of image feature types having a greatest disparity in feature value weights;
      evaluating each of the candidate key frames against the weighted feature values of the identified feature type; and
      ranking each of the candidate key frames according to similarities shared between that candidate key frame and the weighted feature values of the identified feature type; and
   causing a display a selected one of the distinguished candidate key frames as a video thumbnail for the video file.

2. The method of claim 1, further comprising obtaining the textual information, the textual information being obtained automatically from one or more of:
   a filename
   a title of the video file;
   a tag associated with the video file;
   an extraction of close caption text in the video file; and
   a conversion of audio content contained in the video file.

3. The method of claim 1, further comprising:
   causing a network image search utilizing the textual information as a search term or terms;
   identifying a ranked set of images corresponding to results of the image search; and
   selecting, according to rank, a plurality of images from the ranked set as the sample set of images.

4. A non-transitory computer readable medium storing computer executable instructions that when executed implement a method for selecting a video thumbnail, the method comprising:
   generating a visual theme model for a sample set of images that are representative of textual information corresponding to a video file wherein the sample of set of images are not associated with the video file and are not frames from the video file;
   identifying, for each of a plurality of image feature types, a weighted value for each of a set of features shared among the sample set of images;
   distinguishing each of a set of candidate key frames according to similarities shared between that candidate key frame and the visual theme model by evaluating each of the candidate key frames against the weighted feature values; and
   causing a display a selected one of the distinguished candidate key frames as a video thumbnail for the video file wherein the selection is based on an evaluation of each of the candidate key frames against the weighted feature values.

5. The medium of claim 4, wherein the method further comprises obtaining the textual information, the textual information being obtained automatically from one or more of
   a file name of the video file;
   a title of the video file;
   a tag associated with the video file;
   an extraction of close caption text in the video file; and
   a conversion of audio content contained in the video file.

6. The medium of claim 4, wherein the method further comprises:
   causing a network image search utilizing the textual information as a search term or terms;
   identifying a ranked set of images corresponding to results of the image search; and
   selecting, according to rank, a plurality of images from the ranked set as the sample set of images.

7. The medium of claim 4, wherein generating the visual theme model for the sample set of images comprises, for a given image feature type, identifying a weighted value for each of a set of features shared among the sample set of images.

8. The medium of claim 7, wherein distinguishing each of the set of candidate key frames comprises:
   evaluating each of the candidate key frames against the weighted feature values; and
   ranking each of the candidate key frames according to similarities shared between that candidate key frame and the weighted feature values.

9. The medium of claim 4, wherein distinguishing each of the set of candidate key frames comprises:
   identifying an image feature type of the plurality of image feature types having a greatest disparity in feature value weights;
   evaluating each of the candidate key frames against the weighted feature values of the identified feature type; and
   ranking each of the candidate key frames according to similarities shared between that candidate key frame and the weighted feature values of the identified feature type.

10. A system for selecting a video thumbnail, comprising:
   a processor in communication with a memory resource, wherein the memory resource includes a set of instructions, executable by the processing resource including:

a modeling engine operable to generate a visual theme model for the sample set of images that are representative of textual information corresponding to a video file images by, for each of a plurality of image feature types, identifying a weighted value for each of a set of features shared among the sample set of images, wherein the sample set of images are not associated with the video file images and are not frames from the video file;

an evaluation engine operable to distinguish each of a set of candidate key frames according to similarities shared between that candidate key frame and the visual theme model by evaluating each of the candidate key frames against the weighted feature values of the feature types and by ranking the candidate key frames; and a display engine operable to cause a display a selected one of a number of ranked candidate key frames as a video thumbnail for the video file.

11. The system of claim 10, wherein the modeling engine is operable to obtain the textual information from one or more of:
   a file name of the video file;
   a title of the video file;
   a tag associated with the video file;
   an extraction of close caption text in the video file; and
   a conversion of audio content contained in the video file.

12. The system of claim 10, wherein the modeling engine is operable to:
   cause a network image search utilizing the textual information as a search term or terms;
   identify a ranked set of images corresponding to results of the image search; and
   select, according to rank, a plurality of images from the ranked set as the sample set of images.

13. The system of claim 10, wherein the modeling engine is operable to generate the visual theme model for the sample set of images by, for a given image feature type, identifying a weighted value for each of a set of features shared among the sample set of images.

14. The system of claim 13, wherein the evaluation engine is operable to distinguishing each of the set of candidate key frames by:
   evaluating each of the candidate key frames against the weighted feature values; and
   ranking each of the candidate key frames according to similarities shared between that candidate key frame and the weighted feature values.

15. The system of claim 10, wherein the evaluation engine is operable to distinguish each of a set of candidate key frames by:
   identifying an image feature type of the plurality of image feature types having a greatest disparity in feature value weights;
   evaluating each of the candidate key frames against the weighted feature values of the identified feature type; and
   ranking each of the candidate key frames according to similarities shared between that candidate key frame and weighted feature values of the identified feature type.

* * * * *

UNITED STATES PATENT AND TRADEMARK OFFICE
CERTIFICATE OF CORRECTION

| | | |
|---|---|---|
| PATENT NO. | : 8,571,330 B2 | Page 1 of 1 |
| APPLICATION NO. | : 12/561923 | |
| DATED | : October 29, 2013 | |
| INVENTOR(S) | : Yuli Gao et al. | |

It is certified that error appears in the above-identified patent and that said Letters Patent is hereby corrected as shown below:

In the Claims:

In column 9, line 58, in Claim 2, delete "filename" and insert -- filename; --, therefor.

In column 10, line 27, in Claim 5, delete "of" and insert -- of: --, therefor.

Signed and Sealed this
Eleventh Day of February, 2014

Michelle K. Lee
*Deputy Director of the United States Patent and Trademark Office*